US008738643B1

(12) United States Patent
Czuba et al.

(10) Patent No.: US 8,738,643 B1
(45) Date of Patent: May 27, 2014

(54) LEARNING SYNONYMOUS OBJECT NAMES FROM ANCHOR TEXTS

(75) Inventors: Krzysztof Czuba, New York, NY (US);
Jonathan T. Betz, Summit, NJ (US);
Jeffrey C. Reynar, New York, NY (US)

(73) Assignee: Google Inc., Mountain View, CA (US)

( * ) Notice: Subject to any disclaimer, the term of this patent is extended or adjusted under 35 U.S.C. 154(b) by 1327 days.

(21) Appl. No.: 11/833,180

(22) Filed: Aug. 2, 2007

(51) Int. Cl.
*G06F 17/30* (2006.01)
*G06F 7/00* (2006.01)

(52) U.S. Cl.
USPC .......................... 707/767; 707/730; 707/731

(58) Field of Classification Search
None
See application file for complete search history.

(56) References Cited

U.S. PATENT DOCUMENTS

| 5,010,478 | A | 4/1991 | Deran | 364/200 |
|---|---|---|---|---|
| 5,133,075 | A | 7/1992 | Risch | 395/800 |
| 5,347,653 | A | 9/1994 | Flynn et al. | 395/600 |
| 5,440,730 | A | 8/1995 | Elmasri et al. | 395/600 |
| 5,475,819 | A | 12/1995 | Miller et al. | 395/200.03 |
| 5,519,608 | A | 5/1996 | Kupiec | 364/419.08 |
| 5,560,005 | A | 9/1996 | Hoover et al. | 395/600 |
| 5,574,898 | A | 11/1996 | Leblang et al. | 395/601 |
| 5,680,622 | A | 10/1997 | Even | 395/709 |
| 5,694,590 | A | 12/1997 | Thuraisingham et al. | 395/600 |
| 5,701,470 | A | 12/1997 | Joy et al. | 395/614 |
| 5,717,911 | A | 2/1998 | Madrid et al. | 395/602 |
| 5,717,951 | A | 2/1998 | Yabumoto | 395/831 |
| 5,778,378 | A | 7/1998 | Rubin | 707/103 |
| 5,787,413 | A | 7/1998 | Kauffman et al. | 707/2 |
| 5,793,966 | A | 8/1998 | Amstein et al. | 395/200.33 |
| 5,802,299 | A | 9/1998 | Logan | 395/200.48 |
| 5,815,415 | A | 9/1998 | Bentley | 364/578 |
| 5,819,210 | A | 10/1998 | Maxwell, III et al. | 704/9 |
| 5,819,265 | A | 10/1998 | Ravin et al. | 707/5 |
| 5,822,743 | A | 10/1998 | Gupta et al. | 706/50 |
| 5,826,258 | A | 10/1998 | Gupta et al. | 707/4 |
| 5,838,979 | A | 11/1998 | Hart et al. | |
| 5,909,689 | A | 6/1999 | Van Ryzin | 707/203 |

(Continued)

FOREIGN PATENT DOCUMENTS

| JP | 5-174020 A | 7/1993 | G06F 17/21 |
|---|---|---|---|
| WO | WO 01/27713 A2 | 4/2001 | |
| WO | WO 2004/114163 | 12/2004 | G06F 17/30 |
| WO | WO 2006/104951 | 10/2006 | G06F 17/30 |

OTHER PUBLICATIONS

Agichtein, E., et al., "Snowball Extracting Relations from Large Plain-Text Collections," Columbia Univ. Computer Science Dept. Technical Report CUCS-033-99, Dec. 1999, pp. 1-13.

(Continued)

*Primary Examiner* — Sherief Badawi
*Assistant Examiner* — Berhanu Mitiku
(74) *Attorney, Agent, or Firm* — Morgan, Lewis & Bockius LLP

(57) ABSTRACT

A repository contains objects representing entities. The objects also include facts about the represented entities. The facts are derived from source documents. A synonymous name of an object is determined by identifying a source document from which one or more facts of the entity represented by the object were derived, identifying a plurality of linking documents that link to the source document through hyperlinks, each hyperlink having an anchor text, processing the anchor texts in the plurality of linking documents to generate a collection of synonym candidates for the entity represented by the object, and selecting a synonymous name for the entity represented by the object from the collection of synonym candidates.

27 Claims, 10 Drawing Sheets

(56) References Cited

U.S. PATENT DOCUMENTS

| | | | |
|---|---|---|---|
| 5,920,859 A | 7/1999 | Li | 707/5 |
| 5,943,670 A | 8/1999 | Prager | 707/5 |
| 5,956,718 A | 9/1999 | Prasad | 707/10 |
| 5,974,254 A | 10/1999 | Hsu | 395/703 |
| 5,987,460 A | 11/1999 | Niwa et al. | 707/5 |
| 6,018,741 A | 1/2000 | Howland et al. | 707/102 |
| 6,044,366 A | 3/2000 | Graffe | 707/2 |
| 6,052,693 A | 4/2000 | Smith et al. | 707/104 |
| 6,078,918 A | 6/2000 | Allen et al. | 707/6 |
| 6,112,203 A | 8/2000 | Bharat et al. | 707/5 |
| 6,112,210 A | 8/2000 | Nori et al. | 707/103 |
| 6,122,647 A | 9/2000 | Horowitz et al. | 707/513 |
| 6,134,555 A | 10/2000 | Chadha | 707/102 |
| 6,138,270 A | 10/2000 | Hsu | 717/3 |
| 6,212,526 B1 | 4/2001 | Chaudhuri et al. | 707/102 |
| 6,240,546 B1 | 5/2001 | Lee et al. | 717/4 |
| 6,263,328 B1 | 7/2001 | Coden et al. | 707/3 |
| 6,285,999 B1 | 9/2001 | Page | 707/5 |
| 6,289,338 B1 | 9/2001 | Stoffel et al. | 707/3 |
| 6,311,194 B1 | 10/2001 | Sheth et al. | 707/505 |
| 6,327,574 B1 | 12/2001 | Kramer et al. | 705/14 |
| 6,349,275 B1 | 2/2002 | Schumacher et al. | 704/8 |
| 6,377,943 B1 | 4/2002 | Jakobsson | 707/2 |
| 6,397,228 B1 | 5/2002 | Lamburt et al. | 707/203 |
| 6,473,898 B1 | 10/2002 | Waugh et al. | 717/168 |
| 6,502,102 B1 | 12/2002 | Haswell et al. | 707/102 |
| 6,556,991 B1 | 4/2003 | Borkovsky | 707/6 |
| 6,567,936 B1 | 5/2003 | Yang et al. | 714/37 |
| 6,572,661 B1 | 6/2003 | Stern | 715/501.1 |
| 6,584,464 B1 | 6/2003 | Warthen | 707/4 |
| 6,606,625 B1 | 8/2003 | Muslea | 707/6 |
| 6,606,659 B1 | 8/2003 | Hegli et al. | 709/225 |
| 6,609,123 B1 | 8/2003 | Cazemier et al. | 707/4 |
| 6,656,991 B2 | 12/2003 | Staccione et al. | 524/430 |
| 6,665,659 B1 | 12/2003 | Logan | 707/3 |
| 6,665,666 B1 | 12/2003 | Brown et al. | 707/5 |
| 6,665,837 B1 | 12/2003 | Dean et al. | 707/5 |
| 6,745,189 B2 | 6/2004 | Schreiber | 707/10 |
| 6,754,873 B1 | 6/2004 | Law | 715/501.1 |
| 6,799,176 B1 | 9/2004 | Page | 707/5 |
| 6,804,667 B1 | 10/2004 | Martin | 707/6 |
| 6,820,081 B1 | 11/2004 | Kawai et al. | 707/7 |
| 6,820,093 B2 | 11/2004 | de la Huerga | |
| 6,823,495 B1 | 11/2004 | Vedula et al. | 715/805 |
| 6,850,896 B1 | 2/2005 | Kelman et al. | 705/1 |
| 6,886,005 B2 | 4/2005 | Davis | 707/2 |
| 6,901,403 B1 | 5/2005 | Bata | 707/101 |
| 6,957,213 B1 | 10/2005 | Yuret | 707/4 |
| 6,963,880 B1 | 11/2005 | Pingte et al. | 707/103 |
| 7,003,522 B1 | 2/2006 | Reynar et al. | 707/10 |
| 7,003,719 B1 | 2/2006 | Rosenoff et al. | 715/500.1 |
| 7,020,662 B2 | 3/2006 | Boreham et al. | 707/104.1 |
| 7,051,023 B2 | 5/2006 | Kapur et al. | 707/5 |
| 7,080,073 B1 | 7/2006 | Jiang et al. | 707/7 |
| 7,080,085 B1 | 7/2006 | Choy | 707/101 |
| 7,143,099 B2 | 11/2006 | Lecheler-Moore | 707/101 |
| 7,146,536 B2 | 12/2006 | Bingham, Jr. et al. | 714/26 |
| 7,162,499 B2 | 1/2007 | Lees et al. | 707/203 |
| 7,194,380 B2 | 3/2007 | Barrow et al. | 702/181 |
| 7,197,449 B2 | 3/2007 | Hu et al. | 704/9 |
| 7,277,879 B2 | 10/2007 | Varadarajan | 707/1 |
| 7,305,380 B1 | 12/2007 | Hoelzle et al. | 707/3 |
| 7,363,312 B2 | 4/2008 | Goldsack | 707/102 |
| 7,472,182 B1 | 12/2008 | Young et al. | 709/224 |
| 7,483,829 B2 * | 1/2009 | Murakami et al. | 704/10 |
| 7,493,317 B2 | 2/2009 | Geva | 707/3 |
| 7,610,382 B1 * | 10/2009 | Siegel | 709/226 |
| 7,747,571 B2 | 6/2010 | Boggs | |
| 7,797,282 B1 | 9/2010 | Kirshenbaum et al. | 707/651 |
| 2002/0038307 A1 | 3/2002 | Obradovic et al. | 707/102 |
| 2002/0042707 A1 | 4/2002 | Zhao et al. | 704/9 |
| 2002/0065845 A1 | 5/2002 | Naito et al. | 707/500.1 |
| 2002/0073115 A1 | 6/2002 | Davis | 707/500 |
| 2002/0083039 A1 | 6/2002 | Ferrari et al. | 707/1 |
| 2002/0087567 A1 | 7/2002 | Spiegler et al. | |
| 2002/0147738 A1 | 10/2002 | Reader | 707/500 |
| 2002/0169770 A1 * | 11/2002 | Kim et al. | 707/5 |
| 2002/0178448 A1 | 11/2002 | Te Kiefte et al. | 725/46 |
| 2002/0194172 A1 | 12/2002 | Schreiber | 707/4 |
| 2003/0018652 A1 | 1/2003 | Heckerman et al. | 707/104 |
| 2003/0058706 A1 | 3/2003 | Okamoto et al. | 365/200 |
| 2003/0078902 A1 | 4/2003 | Leong et al. | 706/59 |
| 2003/0120644 A1 | 6/2003 | Shirota | 707/3 |
| 2003/0120675 A1 | 6/2003 | Stauber et al. | 707/100 |
| 2003/0126102 A1 | 7/2003 | Borthwick | 706/21 |
| 2003/0149567 A1 | 8/2003 | Schmitz et al. | 704/270 |
| 2003/0154071 A1 | 8/2003 | Shreve | 704/9 |
| 2003/0177110 A1 | 9/2003 | Okamoto et al. | 707/3 |
| 2003/0182310 A1 | 9/2003 | Charnock et al. | 707/104.1 |
| 2003/0195877 A1 | 10/2003 | Ford et al. | 707/3 |
| 2003/0196052 A1 | 10/2003 | Bolik et al. | 711/162 |
| 2004/0003067 A1 | 1/2004 | Ferrin | 709/223 |
| 2004/0024739 A1 | 2/2004 | Copperman et al. | 707/1 |
| 2004/0064447 A1 * | 4/2004 | Simske et al. | 707/5 |
| 2004/0088292 A1 | 5/2004 | Dettinger et al. | 707/4 |
| 2004/0107125 A1 | 6/2004 | Guheen et al. | 705/7 |
| 2004/0122844 A1 | 6/2004 | Malloy et al. | 707/102 |
| 2004/0123240 A1 | 6/2004 | Gerstl et al. | 715/513 |
| 2004/0128624 A1 | 7/2004 | Arellano et al. | 715/530 |
| 2004/0143600 A1 | 7/2004 | Musgrove et al. | 707/104.1 |
| 2004/0153456 A1 | 8/2004 | Charnock et al. | 707/10 |
| 2004/0167870 A1 | 8/2004 | Wakefield et al. | 707/1 |
| 2004/0177015 A1 | 9/2004 | Galai et al. | 705/35 |
| 2004/0199923 A1 | 10/2004 | Russek | 719/310 |
| 2004/0240542 A1 | 12/2004 | Yeredor et al. | |
| 2004/0255237 A1 | 12/2004 | Tong | 715/501.1 |
| 2004/0260979 A1 * | 12/2004 | Kumai | 714/37 |
| 2004/0267700 A1 | 12/2004 | Dumais et al. | 707/2 |
| 2005/0076012 A1 | 4/2005 | Manber | 707/3 |
| 2005/0086211 A1 | 4/2005 | Mayer | 707/3 |
| 2005/0086222 A1 | 4/2005 | Wang et al. | 707/5 |
| 2005/0097150 A1 | 5/2005 | McKeon et al. | |
| 2005/0125311 A1 | 6/2005 | Chidiac et al. | 705/28 |
| 2005/0149576 A1 | 7/2005 | Marmaros et al. | 707/200 |
| 2005/0149851 A1 | 7/2005 | Mittal | 715/501.1 |
| 2005/0187923 A1 | 8/2005 | Cipollone et al. | 707/3 |
| 2005/0240615 A1 | 10/2005 | Barsness et al. | 707/102 |
| 2005/0256825 A1 | 11/2005 | Dettinger et al. | 707/1 |
| 2006/0026122 A1 | 2/2006 | Hurwood et al. | |
| 2006/0036504 A1 | 2/2006 | Allocca et al. | 705/26 |
| 2006/0041597 A1 | 2/2006 | Conrad et al. | 707/200 |
| 2006/0047838 A1 | 3/2006 | Chauhan | 709/230 |
| 2006/0053171 A1 | 3/2006 | Ethridge et al. | 707/203 |
| 2006/0053175 A1 | 3/2006 | Gardner et al. | 707/203 |
| 2006/0074824 A1 | 4/2006 | Li | 706/20 |
| 2006/0074910 A1 | 4/2006 | Yun | 707/7 |
| 2006/0085465 A1 | 4/2006 | Nori et al. | 707/101 |
| 2006/0136585 A1 | 6/2006 | Mayfield | 709/224 |
| 2006/0143227 A1 | 6/2006 | Helm et al. | 707/103 |
| 2006/0143603 A1 | 6/2006 | Kalthoff et al. | 717/172 |
| 2006/0152755 A1 | 7/2006 | Curtis | 358/1.15 |
| 2006/0167991 A1 | 7/2006 | Heikes et al. | |
| 2006/0238919 A1 | 10/2006 | Bradley | 360/128 |
| 2006/0248045 A1 | 11/2006 | Toledano et al. | 707/2 |
| 2006/0248456 A1 | 11/2006 | Bender et al. | 715/531 |
| 2006/0253418 A1 | 11/2006 | Charnock et al. | 707/1 |
| 2006/0288268 A1 | 12/2006 | Srinivasan et al. | 715/505 |
| 2006/0293879 A1 | 12/2006 | Zhao et al. | 704/9 |
| 2007/0005593 A1 | 1/2007 | Self et al. | 707/6 |
| 2007/0005639 A1 | 1/2007 | Gaussier et al. | 707/103 |
| 2007/0016890 A1 | 1/2007 | Brunner et al. | 717/107 |
| 2007/0038610 A1 | 2/2007 | Omoigui | 707/3 |
| 2007/0073768 A1 | 3/2007 | Goradia | 707/104.1 |
| 2007/0094246 A1 | 4/2007 | Dill et al. | 707/4 |
| 2007/0130123 A1 | 6/2007 | Majumder | 707/3 |
| 2007/0143317 A1 | 6/2007 | Hogue et al. | 707/100 |
| 2007/0150800 A1 | 6/2007 | Betz et al. | 715/500 |
| 2007/0198480 A1 | 8/2007 | Hogue et al. | |
| 2007/0198481 A1 | 8/2007 | Hogue et al. | |
| 2007/0203867 A1 | 8/2007 | Hogue et al. | 706/48 |
| 2007/0240031 A1 * | 10/2007 | Zhao | 715/501.1 |
| 2007/0271268 A1 | 11/2007 | Fontoura et al. | 707/6 |

(56) References Cited

U.S. PATENT DOCUMENTS

| | | | |
|---|---|---|---|
| 2008/0071739 A1* | 3/2008 | Kumar et al. | 707/3 |
| 2008/0127211 A1 | 5/2008 | Belsey et al. | |
| 2009/0006359 A1* | 1/2009 | Liao | 707/5 |

OTHER PUBLICATIONS

Andritsos, P. et al., "Information-Theoretic Tools for Mining Database Structure from Large Data Sets," ACM SIGMOD, Jun. 13-18, 2004, 12 pages.
Brill, E., et al., "An Analysis of the AskMSR Question-Answering System," Proceedings of the Conference of Empirical Methods in Natural Language Processing (EMNLP), Jul. 2002, pp. 257-264.
Brin, S., Extracting Patterns and Relations from the World Wide Web, 1999, 12 pages.
Brin, S., et al., "The Anatomy of a Large-Scale Hypertextual Web Search Engine," 7th Int'l World Wide Web Conference, Brisbane, Australia, Apr. 14-18, 1998, pp. 1-26.
Bunescu, R., et al., "Using Encyclopedia Knowledge for Named Entity Disambiguation," Department of Computer Sciences, University of Texas, retrieved from internet Dec. 28, 2006, 8 pages.
Chang, C., et al., "IEPAD: Information Extraction Based on Pattern Discovery," WWW 10 01, ACM, May 1-5, 2001, pp. 681-688.
Chen, X. et al., "A Scheme for Inference Problems Using Rough Sets and Entropy," Springer-Verlag Berlin Heidelberg 2005, pp. 558-567.
Chu-Carroll, J., et al., "A Multi-Strategy with Multi-Source Approach to Question Answering," 2006, 8 pages.
Cover, T.M., et al., "Elements of Information Theory," Wiley-InterScience, New York, NY, 1991, pp. 12-23.
Craswell, N., et al., "Effective Site Finding using Link Anchor Information," SIGIR '01, Sep. 9-12, 2001, pp. 250-257.
Dean, J., et al., "MapReduce: Simplified Data Processing on Large Clusters," OSDI, 2004, pp. 1-13.
Dong, X., et al., "Reference Reconciliation in Complex Information Spaces," SIGACM-SIGMOD 2005, 12 pages.
Downey, D., et al., "Learning Text Patterns for Web Information Extraction and Assessment," American Association for Artificial Intelligence, 2002, 6 pages.
Etzioni, O., et al., "Web-scale Information Extraction in KnowItAll(Preliminary Results),"WWW2004, ACM May 17-20, 2004, 11 pages.
Freitag, D., et al., "Boosted Wrapper Induction," American Association for Artificial Intelligence, 2000, 7 pages.
Gao, X., et al., "Learning Information Extraction Patterns from Tabular Web Pages Without Manual Labelling," Proceedings of IEEE/WIC Int'l Conf. on Web Intelligence (WI'03), Oct. 13-17, 2003, pp. 495-498.
Gray, R.M., "Entropy and Information Theory," Springer-Verlag, New York, NY, 1990, pp. 17-46.
Guha, R., "Object Co-Identification on the Semantic Web," WWW2004, ACM, May 17-22, 2004, 9 pages.
Guha, R., et al., "Disambiguating People in Search," World Wide Web Conference, May 17-22, 2004, 9 pages.
Haveliwala, T.H., "Topic-Sensitive PageRank," Proceeding of the 11th Int'l World Wide Web Conference, Honolulu, Hawaii, May 7-11, 2002, pp. 1-23.
Hogue, A. W., Tree Pattern Inference and Matching for Wrapper Induction on the World Wide Web, Master of Engineering in Electrical Engineering and Computer Science, Massachusetts Institute of Technology, Jun. 2004, pp. 1-106.
Information Entropy—Wikipedia, the Free Encyclopedia, Retrieved on May 3, 2006, pp. 1-9.
Information Theory—Wikipedia, the Free Encyclopedia,: Retrieved on May 3, 2006, pp. 1-12.
International Search Report and Written Opinion for International Application No. PCT/US2007/61156, mailed Feb. 11, 2008, 7 pages.
International Search Report and Written Opinion for International Application No. PCT/US2006/019807, mailed Dec. 18, 2006, 4 pages.
International Search Report and Written Opinion, PCT/US06/07639 mailed Sep. 13, 2006, 6 pages.
Jeh, G., et al., "Scaling Personalized Web Search," Proceedings of the 12th Int'l World Wide Web Conference, Budapest, Hungary, May 20-24, 2003, pp. 1-24.
Ji, H., et al., "Re-Ranking Algorithms for Name Tagging," Workshop on Computationally Hard Problems and Joint Inference in Speech and Language Processing, Jun. 2006, 8 pages.
Jones, R., et al., Bootstrapping for Text Learning Tasks, 1999, 12 pages.
Koeller, A. et al., "Approximate Matching of Textual Domain Attributes for Information Source Integration," IQIS, Jun. 17, 2005, pp. 77-86.
Kolodner, J., "Indexing and Retrieval Strategies for Natural Language Fact Retrieval," ACM Trans. Database Syst. 8.3., Sep. 1983, 434-464.
Kosseim, L., et al., "Answer Formulation for Question-Answering," 11 pages, Oct. 1, 2007.
Liu, B. et al., "Mining Data Records in Web Pages," Conference 2000, ACM, 2000, pp. 1-10.
McCallum, A., et al., "Object Consolidation by Graph Partitioning with a Conditionally-Trained Distance Metric, "SIGKDD 03, ACM, Aug. 24-27, 2003, 6 pages.
Mann, G. et al., "Unsupervised Personal Name Disambiguation," Proceedings of the Seventy Conference on Natural Language Learning at HLT-NAACL 2003, 8 pages.
Mihalcea, R., et al., PageRank on Semantic Networks, with Application to Word Sense Disambiguation, Proceedings of the 20th International Conference on Computational Linguistics, Aug. 23-27, 2004, 7 pages.
Microsoft Computer Dictionary Defines "quantity" as a "number", http://proquest.safaribooksonline.com/0735614954, May 1, 2002, 3 pages.
Microsoft Computer Dictionary defines "value" as "a quantity", http://proquest.safaribooksonline.com/0735614954/ch18, May 1, 2002, 1 page.
Microsoft Computer Dictionary defines "normalize" as "adjust number within specific range", http://proquest.safaribooksonline.com/0735614954, May 1, 2002, 4 pages.
Mihalcea, R., et al., "TextRank: Bringing Order into Texts," Proceedings of the Conference on Empirical Methods in Natural Language Processing, Jul. 2004, 8 pages.
Page, L., et al., "The PageRank Citation Ranking: Bringing Order to the Web," Stanford Digital Libraries Working Paper, 1998, pp. 1-17.
Pawson, D., "Sorting and Grouping," www.dpawson.co.uk/xsl/sect2/N6280.html>, Feb. 7, 2004, pp. 1-19.
Prager, J. et al., "IBM's Piquant in TREC2003,"2003, 10 pages.
Prager, J., et al., Question Answering Using Constraint Satisfaction: QA-by Dossier with Constraints, 2004, 8 pages.
Ramakrishnan, G., et al., "Is Question Answering an Acquired Skill?" WWW2004, ACM May 17, 2004, pp. 111-120.
Richardson, M., et al., "Beyond Page Rank: Machine Learning for Static Ranking," International World Wide Web Conference Committee, May 23, 2006, 9 pages.
Richardson, M., et al., "The Intelligent Surfer: Probabilistic Combination of Link and Content Information in PageRank," Advances in Neural Information Processing Systems, vol. 14, MIT Press, Cambridge, MA, 2002, 8 pages.
Rioloff, E., et al., "Learning Dictionaries for Information Extraction by Multi-Level Bootstrapping," American Association for Artificial Intelligence, 1999, 6 pages.
Shannon, C.E., et al., "A Mathematical Theory of Communication," The Bell System Technical Journal, vol. 27, Jul., Oct. 1948, pp. 1-55.
Sun Microsystems, "Attribute Names," http://java.sun.com/products/jndi/tutorial/basics/directory/attrnames.html>, Feb. 17, 2004, pp. 1-2.
Wang, Y., et al., "C4-2: Combining Link and Contents in Clustering Web Search to Improve Information Interpretation," The University of Tokyo, 2002, , pp. 1-9.
Wirzenius, Lars, "C Preprocessor Trick for Implementing Similar Data Types," Jan. 17, 2000, pp. 1-9.

(56) References Cited

OTHER PUBLICATIONS

MacKay, *Probability, Entropy, and Inference*, Chapter 2 of Information Theory, Inference, and Learning Algorithms, Cambridge University Press 2003, Version 7.2, Mar. 28, 2005, pp. 22-33 and 138-140.
Merriam Webster Dictionary defines "normalize" as "to make conform to or reduce to a norm or standard", 1865, 2 pages.
Merriam Webster Dictionary defines "value" as "a numerical quantity that is assigned or is determined by calculation or measurement", 1300, 2 pages.
Cheng, Entropy-based Subspace Clustering for Mining Numerical Data, KDD-99, San Diego, CA, Aug. 15-18, 1999, pp. 84-93.
Dey, A Distance-Based Approach to Entity Reconciliation in Heterogeneous Databases, IEEE Transactions on Knowledge and Data Engineering, vol. 14, No. 3, May/Jun. 2002, pp. 567-582.
Hogue, Examiner's Answer, U.S. Appl. No. 11/142,748, Oct. 3, 2011, 23 pgs.
Hogue, Office Action, U.S. Appl. No. 11/142,748, Nov. 17, 2010, 14 pgs.
Hogue, Office Action, U.S. Appl. No. 11/142,748, Jul. 13, 2010, 12 pgs.
Hogue, Office Action, U.S. Appl. No. 11/142,748, Aug. 17, 2009, 14 pgs.
Hogue, Office Action, U.S. Appl. No. 11/142,748, Jul. 22, 2008, 18 pgs.
Hogue, Office Action, U.S. Appl. No. 11/142,748, Aug. 23, 2007, 13 pgs.
Hogue, Office Action, U.S. Appl. No. 11/142,748, Jan. 27, 2009, 17 pgs.
Hogue, Office Action, U.S. Appl. No. 11/142,748, Dec. 7, 2007, 13 pgs.
Hogue, Office Action, U.S. Appl. No. 11/142,748, May 18, 2007, 9 pgs.
Betz, Examiner's Answer, U.S. Appl. No. 11/394,508, Aug. 20, 2010, 28 pgs.
Betz, Office Action, U.S. Appl. No. 11/394,508, Dec. 8, 2009, 14 pgs.
Betz, Office Action, U.S. Appl. No. 11/394,508, Oct. 17, 2008, 18 pgs.
Betz, Office Action, U.S. Appl. No. 11/394,508, May 28, 2009, 20 pgs.
Betz, Office Action, U.S. Appl. No. 11/394,508, Apr. 15, 2008, 14 pgs.
Betz, Office Action, U.S. Appl. No. 11/142,740, Jan. 27, 2009, 11 pgs.
Betz, Office Action, U.S. Appl. No. 11/142,740, Apr. 30, 2008, 14 pgs.
Betz, Office Action, U.S. Appl. No. 11/142,740, Aug. 13, 2007, 12 pgs.
Betz, Office Action, U.S. Appl. No. 11/142,740, Jul. 23, 2008, 11 pgs.
Betz, Office Action, U.S. Appl. No. 11/142,740, Dec. 26, 2007, 12 pgs.
Betz, Office Action, U.S. Appl. No. 11/142,740, May 17, 2007, 12 pgs.
Betz, Office Action, U.S. Appl. No. 11/356,838, Sep. 30, 2008, 15 pgs.
Betz, Office Action, U.S. Appl. No. 11/356,838, May 12, 2009, 14 pgs.
Betz, Office Action, U.S. Appl. No. 11/356,838, Mar. 19, 2008, 12 pgs.
Betz, Office Action, U.S. Appl. No. 11/356,842, Jul. 9, 2010, 36 pgs.
Betz, Office Action, U.S. Appl. No. 11/356,842, Oct. 14, 2008, 18 pgs.
Betz, Office Action, U.S. Appl. No. 11/356,842, Oct. 30, 2009, 24 pgs.
Betz, Office Action, U.S. Appl. No. 11/356,842, Mar. 5, 2009, 19 pgs.
Betz, Office Action, U.S. Appl. No. 11/356,842, Apr. 15, 2008, 14 pgs.
Reynar, Office Action, U.S. Appl. No. 11/692,475, Jul. 9, 2009, 12 pgs.
Petrovic, Office Action, U.S. Appl. No. 11/768,877, Aug. 20, 2010, 36 pgs.
Petrovic, Office Action, U.S. Appl. No. 11/768,877, Mar. 8, 2010, 28 pgs.
Zhao, Office Action, U.S. Appl. No. 11/940,177, Jan. 4, 2010, 7 pgs.
Vespe, Office Action, U.S. Appl. No. 11/745,605, Apr. 8, 2010, 15 pgs.
Vespe, Office Action, U.S. Appl. No. 11/745,605, Jul. 30, 2009, 17 pgs.
Betz, Office Action, U.S. Appl. No. 11/356,765, Aug. 5, 2009, 16 pgs.
Betz, Office Action, U.S. Appl. No. 11/356,765, Aug. 21, 2008, 16 pgs.
Betz, Office Action, U.S. Appl. No. 11/356,765, Aug. 9, 2011, 20 pgs.
Betz, Office Action, U.S. Appl. No. 11/356,765, Feb. 4, 2009, 16 pgs.
Betz, Office Action, U.S. Appl. No. 11/356,765, Feb. 21, 2008, 12 pgs.
Betz, Decision on Appeal, U.S. Appl. No. 11/394,508, Sep. 11, 2013, 8 pgs.
Betz, Notice of Allowance, U.S. Appl. No. 11/394,508, Nov. 27, 2013, 7 pgs.
Betz, Office Action, U.S. Appl. No. 13/585,775, Aug. 8, 2013, 7 pgs.

* cited by examiner

Example Format of Facts in Repository (each fact is associated with an object ID)

Example Facts in Repository (each
fact is associated with an object ID)

Example Object
Reference Table**

Example Format of Facts in
Repository (each fact is associated
with an object ID)

Example Objects

| Object ID | Fact ID | Attribute | Value | Source | |
|---|---|---|---|---|---|
| 402 | 410 | Name | Elvis Aaron Presley | http://www.elvis.com/elvisology/bio/elvis_overview.asp | 420 / 422 |
| | 412 | Date of Birth | January 8, 1935 | http://en.wikipedia.org/wiki/Elvis | 424 |
| | 414 | Origin | East Tupelo, Mississippi, United States | http://www.history-of-rock.com/elvis_presley.htm | |

*FIG. 4(b)*

| Linking Document ID | Source Document ID | Anchor Text |
|---|---|---|
| 430 | 420 | An article about the King |
| 432 | 420 | Homepage of The King |
| 432 | 422 | Learn about Elvis |
| 434 | 422 | Wikipedia article about the King |
| 436 | 422 | Click here! |
| 438 | 424 | The Best Rock Singer Ever |
| 440 | 424 | Find out more about Elvis |

*FIG. 4(c)*

| Linking Document ID | Source Document ID | Anchor Text | synonym candidate |
|---|---|---|---|
| 430 | 420 | An article about the King | the King |
| 432 | 420 | Homepage of The King | The King |
| 432 | 422 | Learn about Elvis | Elvis |
| 434 | 422 | Wikipedia article about the King | the King |
| 436 | 422 | Click here! | |
| 438 | 424 | The Best Rock Singer Ever | The Best Rock Singer Ever |
| 440 | 424 | Find out more about Elvis | Elvis |

FIG. 4(d)

| Object ID | Fact ID | Attribute | Value | Source |
|---|---|---|---|---|
| 402 | 410 | Name | Elvis Aaron Presley | http://www.elvis.com/elvisology/bio/elvis_overview.asp |
| | 412 | Date of Birth | January 8, 1935 | http://en.wikipedia.org/wiki/Elvis |
| | 414 | Origin | East Tupelo, Mississippi, United States | http://www.history-of-rock.com/elvis_presley.htm |
| | 416 | Name | The King | |
| | 418 | Name | Elvis | |

FIG. 4(e)

LEARNING SYNONYMOUS OBJECT NAMES FROM ANCHOR TEXTS

TECHNICAL FIELD

The disclosed embodiments relate generally to fact databases. More particularly, the disclosed embodiments relate to determining names of entities with which objects in a repository are associated.

BACKGROUND

As computers and networks gain popularity, web-based computer documents ("documents") become a vast source of factual information. Users may look to these documents to get answers to factual questions, such as "what is the capital of Poland" or "what is the birth date of George Washington." The factual information included in these documents may be extracted and stored in a fact database.

When extracting facts from documents, facts related to an entity can be organized together in an object representing the entity in a repository. The object can use an object name to identify the represented entity. The object name can be a name of the represented entity. People often use different names (hereinafter called "synonymous names") to refer to the same entity. For example, when a person speaks about "IBM" or "Big Blue," the audience understands that the speaker is referring to the International Business Machines Corporation.

When searching for answers to factual questions in objects, it is useful to know the synonymous names of the relevant entities. Users may conduct a search for a question about an entity using one of its synonymous names (e.g., "IBM"). Objects containing answers to the question may use a different synonymous name (e.g., "International Business Machines Corporation") to identify the same entity. Because the name used in the objects may not match with the name used in the search, users may end up not finding the answers.

One conventional approach to determining synonymous names of an object (the synonymous names of the entity represented by the object) is to consult people familiar with the entity represented by the object. This approach is insufficient because the vast and rapidly increasing number of objects in the repository makes it impractical for any human to perform the task on any meaningful scale. This conventional approach is also expensive and vulnerable to human errors.

For these reasons, what is needed is a way to determine synonymous names of an object that does not suffer from the drawbacks described above.

SUMMARY

The above and other needs are met by methods, systems, and computer program products that determine synonymous names of an object. Embodiments of the method comprise identifying a source document from which one or more facts of an entity represented by the object were derived, and identifying a plurality of linking documents having hyperlinks to the source document, each hyperlink having an anchor text. The method further processes the anchor texts in the plurality of linking documents to generate a collection of synonym candidates for the entity represented by the object, and selects a synonymous name for the entity represented by the object from the collection of synonym candidates. The method stores the synonymous name in the repository in association with the object. Embodiments of the systems and the computer program products comprise instructions executable by a processor to implement the methods.

BRIEF DESCRIPTION OF THE DRAWINGS

FIGS. 4(a)-(e) illustrate an example process of the method illustrated in FIG. 3.

DESCRIPTION OF EMBODIMENTS

Embodiments are now described with reference to the figures where like reference numbers indicate identical or functionally similar elements.

System Architecture and Data Structure

Figure 1:
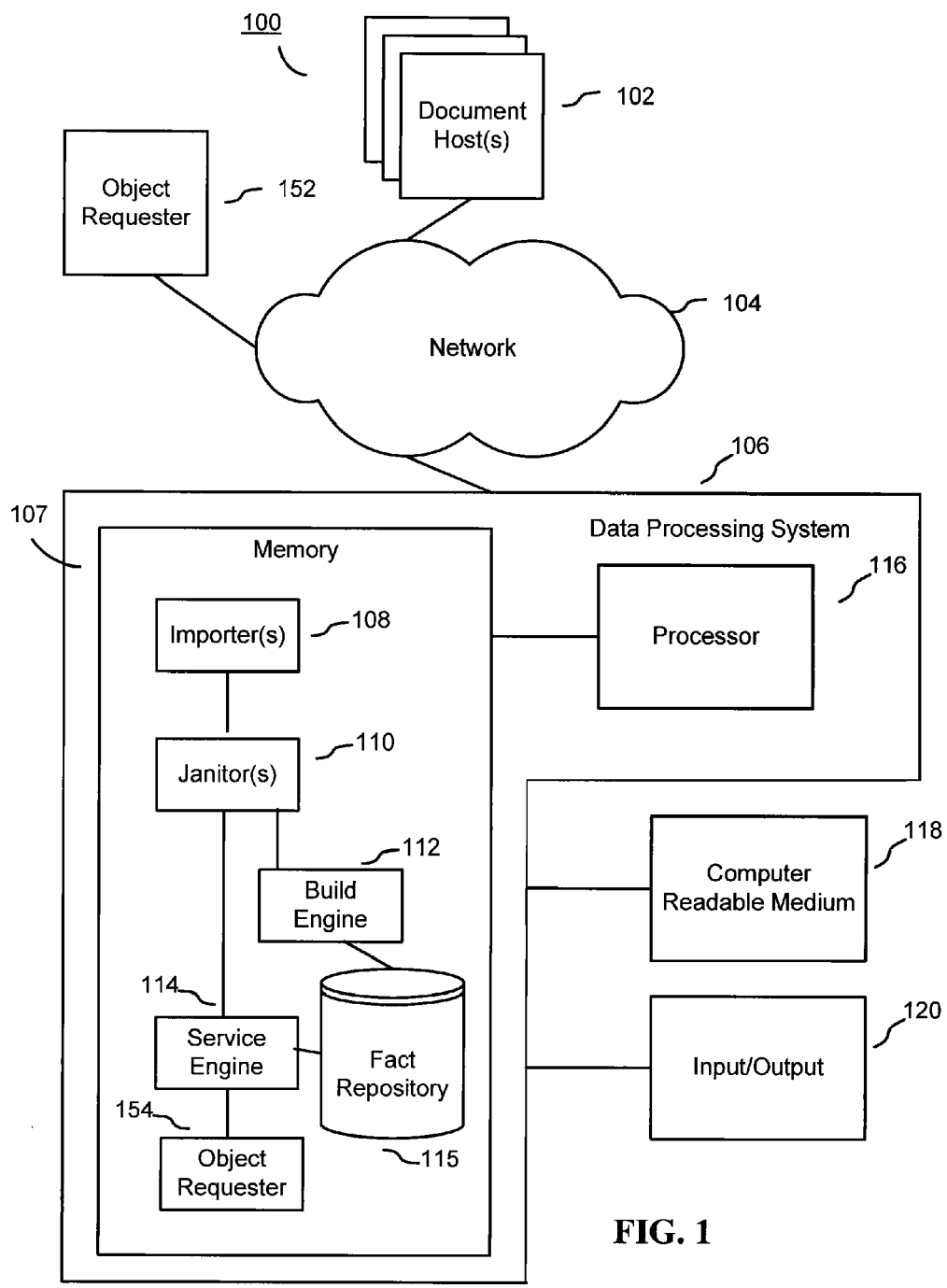
FIG. 1 shows a system architecture in accordance to one embodiment.

FIG. 1 shows a system architecture 100 adapted to support one embodiment. FIG. 1 shows components used to add facts into, and retrieve facts from a repository 115. The system architecture 100 includes a network 104, through which any number of document hosts 102 communicate with a data processing system 106, along with any number of object requesters 152, 154.

Document hosts 102 store documents and provide access to documents. A document is comprised of any machine-readable data including any combination of text, graphics, multimedia content, etc. A document may be encoded in a markup language, such as Hypertext Markup Language (HTML), i.e., a web page, in an interpreted language (e.g., JavaScript) or in any other computer readable or executable format. A document can include one or more hyperlinks to other documents. A typical document will include one or more facts within its content. The facts describe entities, such as a real-world or fictional people, places, or things.

A document stored in a document host 102 may be located and/or identified by a Uniform Resource Locator (URL), or Web address, or any other appropriate form of identification and/or location. A document host 102 is implemented by a computer system, and typically includes a server adapted to communicate over the network 104 via networking protocols (e.g., TCP/IP), as well as application and presentation protocols (e.g., HTTP, HTML, SOAP, D-HTML, JAVA®). The documents stored by a host 102 are typically held in a file directory, a database, or other data repository. A host 102 can be implemented in any computing device (e.g., from a PDA or personal computer, a workstation, mini-computer, or mainframe, to a cluster or grid of computers), as well as in any processor architecture or operating system.

FIG. 1 shows components used to manage facts in a fact repository 115. The data processing system 106 includes one or more importers 108, one or more janitors 110, a build engine 112, a service engine 114, and a fact repository 115 (also called simply a "repository"). Each of the foregoing are implemented, in one embodiment, as software modules (or programs) executed by the processor 116. Importers 108 operate to process documents received from the document hosts, read the data content of documents, and extract facts (as operationally and programmatically defined within the data processing system 106) from such documents. The importers 108 also determine the subject or subjects (i.e., the entity or entities) with which the facts are associated, and extract such facts into individual items of data, for storage in the repository 115. In one embodiment, there are different types of importers 108 for different types of documents, for example, dependent on the format or document type.

Janitors 110 operate to process facts extracted by the importer 108. This processing can include but is not limited to, data cleansing, object merging, and fact induction. In one embodiment, there are a number of different janitors 110 that perform different types of data management operations on the facts. For example, one janitor 110 may traverse some set of facts in the repository 115 to find duplicate facts (that is, facts that convey the same factual information) and merge them. Another janitor 110 may also normalize facts into standard formats. Another janitor 110 may also remove unwanted facts from the repository 115, such as facts related to pornographic content. Other types of janitors 110 may be implemented, depending on the types of data management functions desired, such as translation, compression, spelling or grammar correction, and the like.

Various janitors 110 act on facts to normalize attribute names, and values and delete duplicate and near-duplicate facts so an object does not have redundant information. For example, we might find on one page that Britney Spears' birthday is "Dec. 2, 1981" while on another page that her date of birth is "Dec. 2, 1981." Birthday and Date of Birth might both be rewritten as "Birthdate" by one janitor and then another janitor might notice that Dec. 2, 1981 and Dec. 2, 1981 are different forms of the same date. It would choose the preferred form, remove the other fact and combine the source lists for the two facts. As a result, one source page for this fact will contain an exact match of the fact while another source page will contain text that is considered synonymous with the fact.

The build engine 112 builds and manages the repository 115. The service engine 114 is an interface for querying the repository 115. The service engine 114's main function is to process queries, score matching objects, and return them to the caller but it is also used by the janitor 110.

The repository 115 stores factual information about entities. The information is extracted from a plurality of documents that are located on document hosts 102. A document from which a particular fact may be extracted is a source document (or "source") of that particular fact. In other words, a source of a fact includes that fact (or a synonymous fact) within its contents.

The repository 115 contains one or more facts. In one embodiment, the facts are logically organized into "objects," and each object contains a collection of facts associated with a single entity (i.e., real-world or fictional person, place, or thing). Each fact is associated with exactly one object. One implementation for this association includes in each fact an object ID that uniquely identifies the associated object. In this manner, any number of facts may be associated with an individual object, by including the object ID for that object in the facts. In one embodiment, objects themselves are not physically stored in the repository 115, but rather are defined by the set or group of facts with the same associated object ID, as described below. Further details about facts in the repository 115 are described below, in relation to FIGS. 2(a)-2(d).

Some embodiments operate on the facts and/or objects in different orders than described above. For example, in one embodiment the importer 108 provides facts directly to the build engine 112 and/or repository 115. The janitors 110, in turn, operate on the facts and/or objects in the repository 115. It should also be appreciated that in practice at least some of the components of the data processing system 106 will be distributed over multiple computers, communicating over a network. For example, the repository 115 may be deployed over multiple servers. As another example, the janitors 110 may be located on any number of different computers. For convenience of explanation, however, the components of the data processing system 106 are discussed as though they were implemented on a single computer.

In another embodiment, some or all of document hosts 102 are located on the data processing system 106 instead of being coupled to the data processing system 106 by a network. For example, the importer 108 may import facts from a database that is a part of or associated with the data processing system 106.

FIG. 1 also includes components to access the repository 115 on behalf of one or more object requesters 152, 154. Object requesters are entities that request objects from the repository 115. Object requesters 152, 154 may be understood as clients of the system 106, and can be implemented in any computer device or architecture. As shown in FIG. 1, a first object requester 152 is located remotely from system 106, while a second object requester 154 is located in the data processing system 106. For example, in a computer system hosting a blog, the blog may include a reference to an object whose facts are in the repository 115. An object requester 152, such as a browser displaying the blog, will access data processing system 106 so that the information of the facts associated with the object can be displayed as part of the blog web page. As a second example, a janitor 110 or other entity considered to be part of data processing system 106 can function as an object requester 154, requesting the facts of objects from the repository 115.

FIG. 1 shows that the data processing system 106 includes a memory 107 and one or more processors 116. The memory 107 includes the importers 108, janitors 110, build engine 112, service engine 114, and requester 154, each of which is preferably implemented as instructions stored in memory 107 and executable by processor 116. Memory 107 also includes the repository 115. The repository 115 can be stored in a memory of one or more computer systems or in a type of memory such as a disk. FIG. 1 also includes a computer readable storage medium 118 containing, for example, at least one of importers 108, janitors 110, the build engine 112, the service engine 114, the requester 154, and at least some portions of the repository 115. FIG. 1 also includes one or more input/output devices 120 that allow data to be input and output to and from the data processing system 106. It will be understood that embodiments of the data processing system 106 also include standard software components such as operating systems and the like and further include standard hardware components not shown in the figure for clarity of example.

Figure 2A:
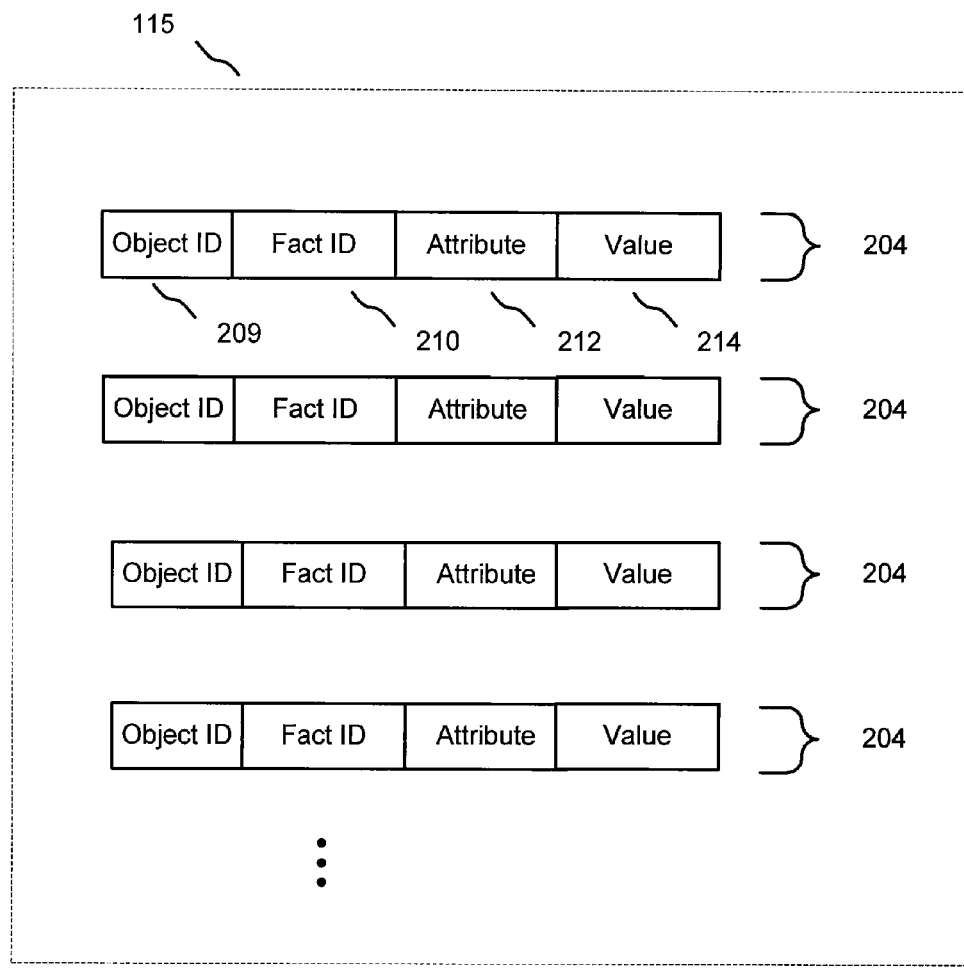
FIGS. 2(a)-2(d) are block diagrams illustrating embodiments of a data structure for facts within a repository of FIG. 1.

FIG. 2(a) shows an example format of a data structure for facts within the repository 115, according to some embodiments. As described above, the repository 115 includes facts 204 describing entities such as real-world and fictional people, places, and things. Each fact 204 includes a unique identifier for that fact, such as a fact ID 210. Each fact 204 includes at least an attribute 212 and a value 214. For example, a fact associated with the entity George Washington may include an attribute of "date of birth" and a value of "Feb. 22, 1732." In one embodiment, all facts are stored as alphanumeric characters since they are extracted from web pages. In another embodiment, facts also can store binary data values. Other embodiments, however, may store fact values as mixed types, or in encoded formats.

As described above, each fact is associated with an object ID 209 that identifies the object with which the fact is associated. Thus, each fact that describes the same entity (such as George Washington), will have the same object ID 209. In one embodiment, the objects are logical concepts that exist as a collection of facts having the same object ID. In another embodiment, objects are stored as units of data in memory, and include references (for example, pointers or IDs) to the facts associated with the object. The logical data structure of a fact can take various forms; in general, a fact is represented by a tuple that includes a fact ID, an attribute, a value, and an object ID. The storage implementation of a fact can be in any underlying physical data structure.

Figure 2B:
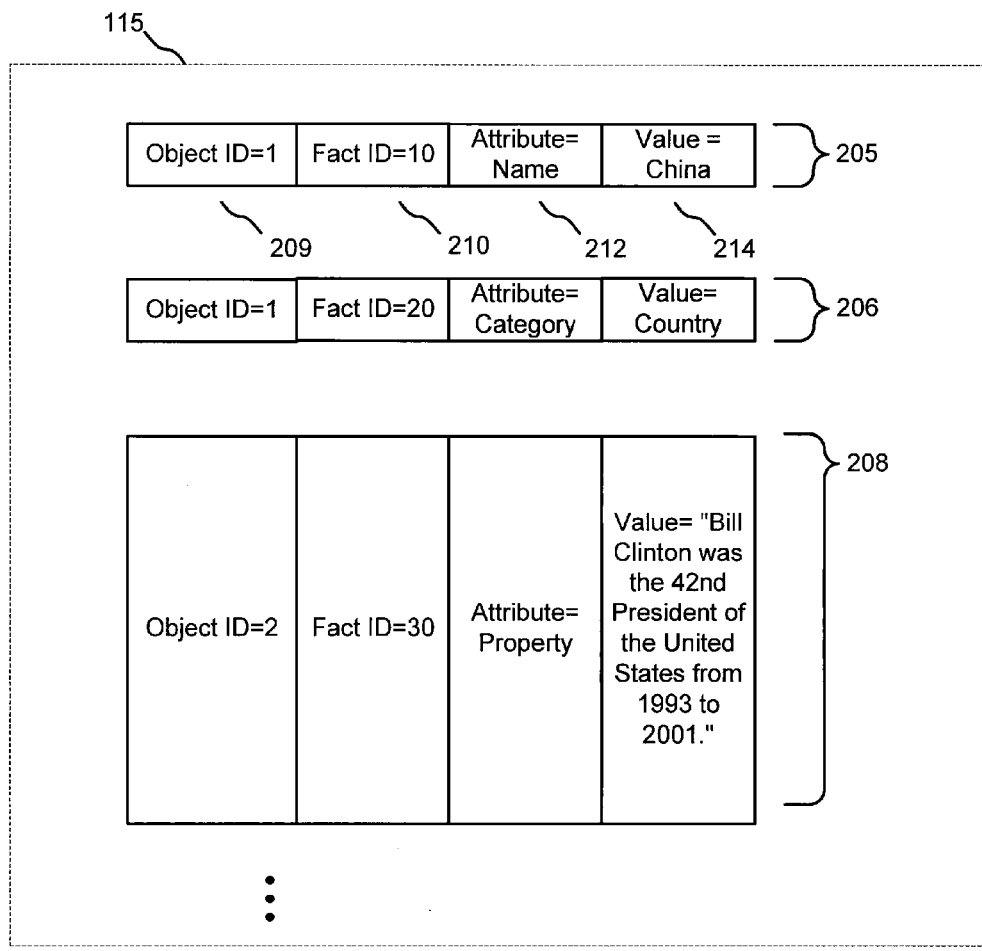

FIG. 2(b) shows an example of facts having respective fact IDs of 10, 20, and 30 in the repository 115. Facts 10 and 20 are associated with an object identified by object ID "1." Fact 10 has an attribute of "Name" and a value of "China." Fact 20 has an attribute of "Category" and a value of "Country." Thus, the object identified by object ID "1" has a name fact 205 with a value of "China" and a category fact 206 with a value of "Country." Fact 30 208 has an attribute of "Property" and a value of ""Bill Clinton was the 42nd President of the United States from 1993 to 2001." Thus, the object identified by object ID "2" has a property fact with a fact ID of 30 and a value of "Bill Clinton was the 42nd President of the United States from 1993 to 2001." In the illustrated embodiment, each fact has one attribute and one value. The number of facts associated with an object is not limited; thus while only two facts are shown for the "China" object, in practice there may be dozens, even hundreds of facts associated with a given object. Also, the value fields of a fact need not be limited in size or content. For example, a fact about the economy of "China" with an attribute of "Economy" would have a value including several paragraphs of text, numbers, and perhaps even tables of figures. This content can be formatted, for example, in a markup language. For example, a fact having an attribute "original html" might have a value of the original html text taken from the source web page.

Also, while the illustration of FIG. 2(b) shows the explicit coding of object ID, fact ID, attribute, and value, in practice the content of the fact can be implicitly coded as well (e.g., the first field being the object ID, the second field being the fact ID, the third field being the attribute, and the fourth field being the value). Other fields include but are not limited to: the language used to state the fact (English, etc.), how important the fact is, the source of the fact, a confidence value for the fact, and so on.

Figure 2C:
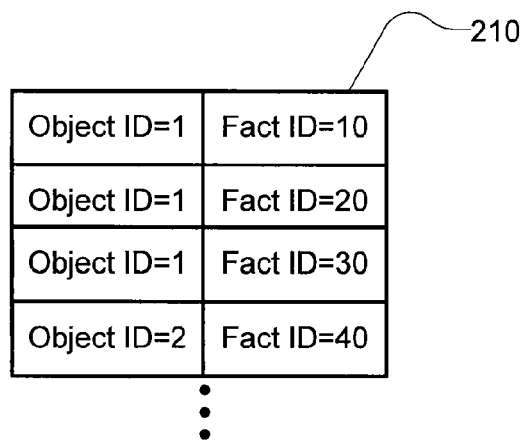

FIG. 2(c) shows an example object reference table 210 that is used in some embodiments. Not all embodiments include an object reference table. The object reference table 210 functions to efficiently maintain the associations between object IDs and fact IDs. In the absence of an object reference table 210, it is also possible to find all facts for a given object ID by querying the repository 115 to find all facts with a particular object ID. While FIGS. 2(b) and 2(c) illustrate the object reference table 210 with explicit coding of object and fact IDs, the table also may contain just the ID values themselves in column or pair-wise arrangements.

Figure 2D:
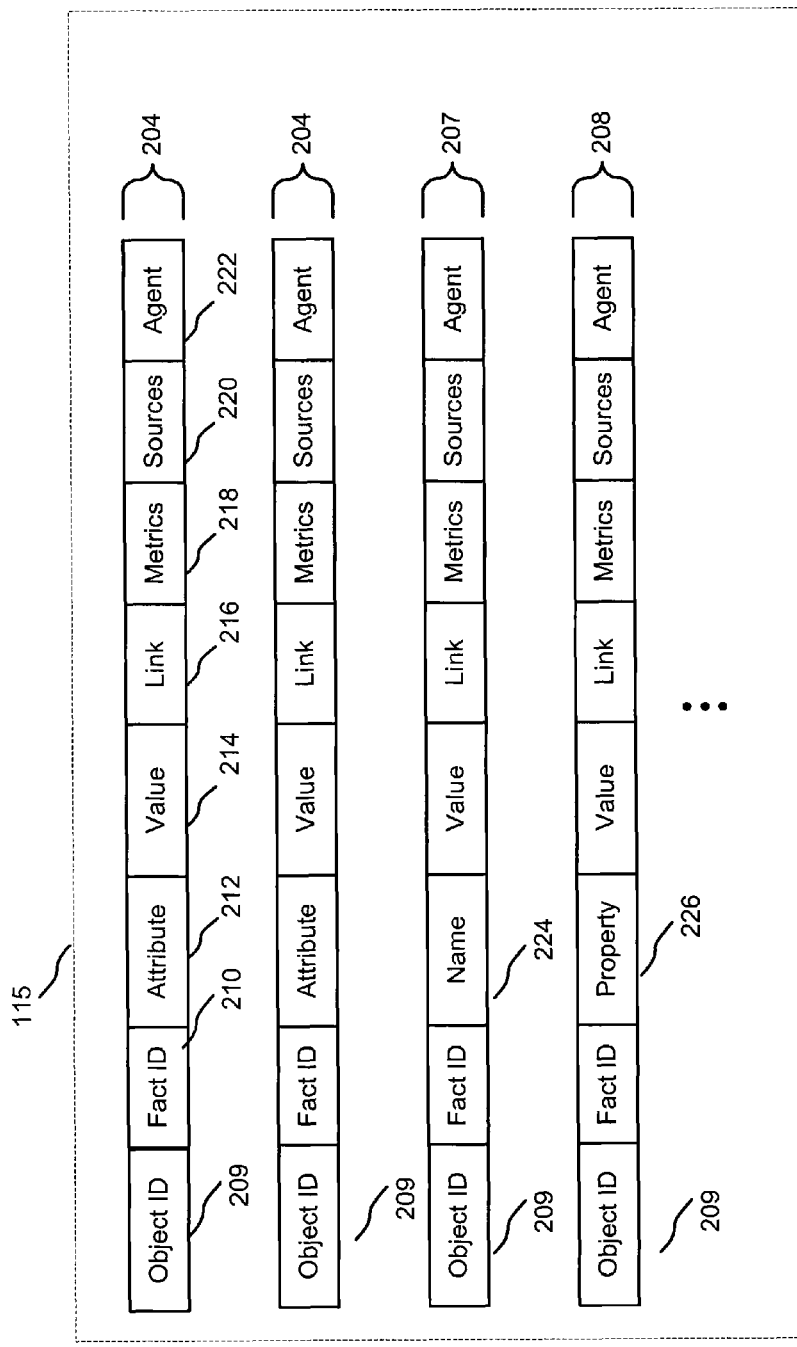

FIG. 2(d) shows an example of a data structure for facts within the repository 115, according to some embodiments, showing an extended format of facts. In this example, the fields include an object reference link 216 to another object. The object reference link 216 can be an object ID of another object in the repository 115, or a reference to the location (e.g., table row) for the object in the object reference table 210. The object reference link 216 allows facts to have as values other objects. For example, for an object associated with the entity "United States," there may be a fact with the attribute of "president" and the value of "George W. Bush," with "George W. Bush" being an object having its own facts in the repository 115. In some embodiments, the value field 214 stores the name of the linked object and the link 216 stores the object identifier of the linked object. Thus, this "president" fact would include the value 214 of "George W. Bush", and an object reference link 216 that contains the object ID for the "George W. Bush" object. In some other embodiments, facts 204 do not include a link field 216 because the value 214 of a fact 204 may store a link to another object.

Each fact 204 also may include one or more metrics 218. A metric provides an indication of the quality of the fact. In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity associated with the object.

Each fact 204 includes a list of one or more sources 220 that include the fact and from which the fact was extracted. Each source may be identified by a URL, or Web address, or any other appropriate form of identification and/or location, such as a unique document identifier.

The facts illustrated in FIG. 2(d) include an agent field 222 that identifies the importer 108 that extracted the fact. For example, the importer 108 may be a specialized importer that extracts facts from a specific source (e.g., the pages of a particular web site, or family of web sites) or type of source (e.g., web pages that present factual information in tabular form), or an importer 108 that extracts facts from free text in documents throughout the Web, and so forth.

Some embodiments include one or more specialized facts, such as a name fact 207 and a property fact 208. A name fact 207 is a fact that conveys a name for the entity associated with the object in which the fact is included. A name fact 207 includes an attribute 224 of "name" and a value, which is the name of the associated entity. For example, for an object associated with country Spain, a name fact would have the value "Spain." A name fact 207, being a special instance of a general fact 204, includes the same fields as any other fact 204; it has an attribute, a value, a fact ID, metrics, sources, etc. The attribute 224 of a name fact 207 indicates that the fact is a name fact, and the value is the actual name. The name may be a string of characters. An object may have one or more associated name facts, as many entities can have more than one name. For example, an object associated with Spain may have associated name facts conveying the country's common name "Spain" and the official name "Kingdom of Spain." As another example, an object associated with the U.S. Patent and Trademark Office may have associated name facts conveying the agency's acronyms "PTO" and "USPTO" as well as the official name "United States Patent and Trademark Office." If an object does have more than one associated name fact, one of the name facts may be designated as a primary name and other name facts may be designated as secondary names, either implicitly or explicitly. The name facts associated with an object are also called synonymous names of the object.

A property fact 208 is a fact that conveys a statement about the entity associated with the object. Property facts are generally used for summary information about an object. A property fact 208, being a special instance of a general fact 204, also includes the same fields (such as attribute, value, fact ID, etc.) as other facts 204. The attribute field 226 of a property fact 208 indicates that the fact is a property fact (e.g., attribute is "property") and the value is a string of text that conveys the statement of interest. For example, for the object associated with Bill Clinton, the value of a property fact may be the text string "Bill Clinton was the 42nd President of the United States from 1993 to 2001." Some objects may have one or more associated property facts while other objects may have no associated property facts. It should be appreciated that the data structures shown in FIGS. 2(a)-2(d) and described above are merely exemplary. The data structure of the repository 115 may take on other forms. Other fields may be included in facts and some of the fields described above may be omitted. Additionally, each object may have additional special facts aside from name facts and property facts, such as facts conveying a type or category (for example, person, place, movie, actor, organization, etc.) for categorizing the entity associated with the object. In some embodiments, an object's name(s) and/or properties may be represented by special records that have a different format than the general fact records 204.

As described previously, a collection of facts is associated with an object ID of an object. An object may become a null or empty object when facts are disassociated from the object. A null object can arise in a number of different ways. One type of null object is an object that has had all of its facts (including name facts) removed, leaving no facts associated with its object ID. Another type of null object is an object that has all of its associated facts other than name facts removed, leaving only its name fact(s). Alternatively, the object may be a null object only if all of its associated name facts are removed. A null object represents an entity or concept for which the data processing system 106 has no factual information and, as far as the data processing system 106 is concerned, does not exist. In some embodiments, facts of a null object may be left in the repository 115, but have their object ID values cleared (or have their importance set to a negative value). However, the facts of the null object are treated as if they were removed from the repository 115. In some other embodiments, facts of null objects are physically removed from the repository 115.

Figure 2E:
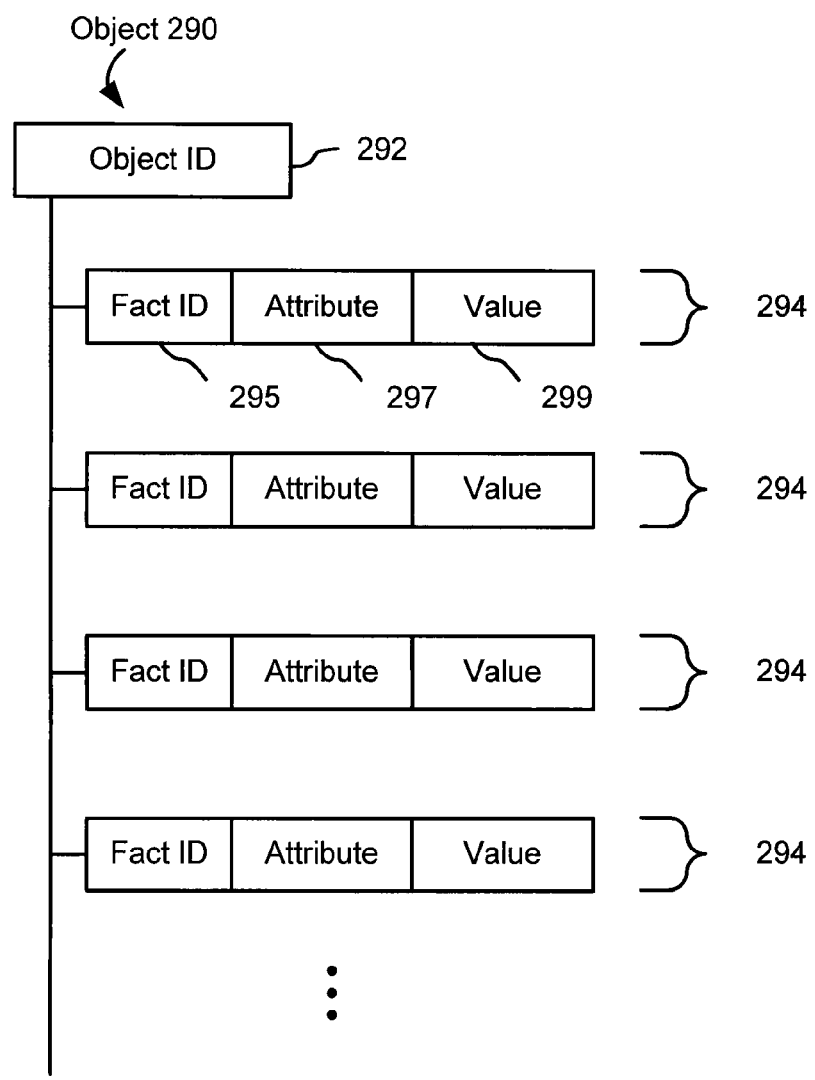
FIG. 2(e) is a block diagram illustrating an embodiment of an alternate data structure for facts and objects.

FIG. 2(e) is a block diagram illustrating an alternate data structure 290 for facts and objects in accordance with embodiments of the invention. In this data structure, an object 290 contains an object ID 292 and references or points to facts 294. Each fact includes a fact ID 295, an attribute 297, and a value 299. In this embodiment, an object 290 actually exists in memory 107.

As described above, an object may explicitly exist in the repository 115, or it may exist merely as a collection of facts with a common object ID. Reference is made to particular objects for the purposes of illustration; one of skill in the art will recognize that the systems and methods described herein are applicable to a variety of implementations and that such references are not limiting. When reference is made to a fact being associated with an object, it should be understood that in at least one embodiment a fact is associated with an object by sharing a common object ID with other facts. For example, a fact could be associated with an object of a given type by sharing a common object ID at least with a type fact indicating the given type (or as another example, with a category fact indicating a particular category of object). Furthermore, in various embodiments, facts and objects can be stored in a variety of structures, such as fact and/or object repositories. When reference is made herein to the repository 115, it should be understood that various embodiments may store facts and/or objects in a variety of data structures.

Overview of Methodology

Figure 3:
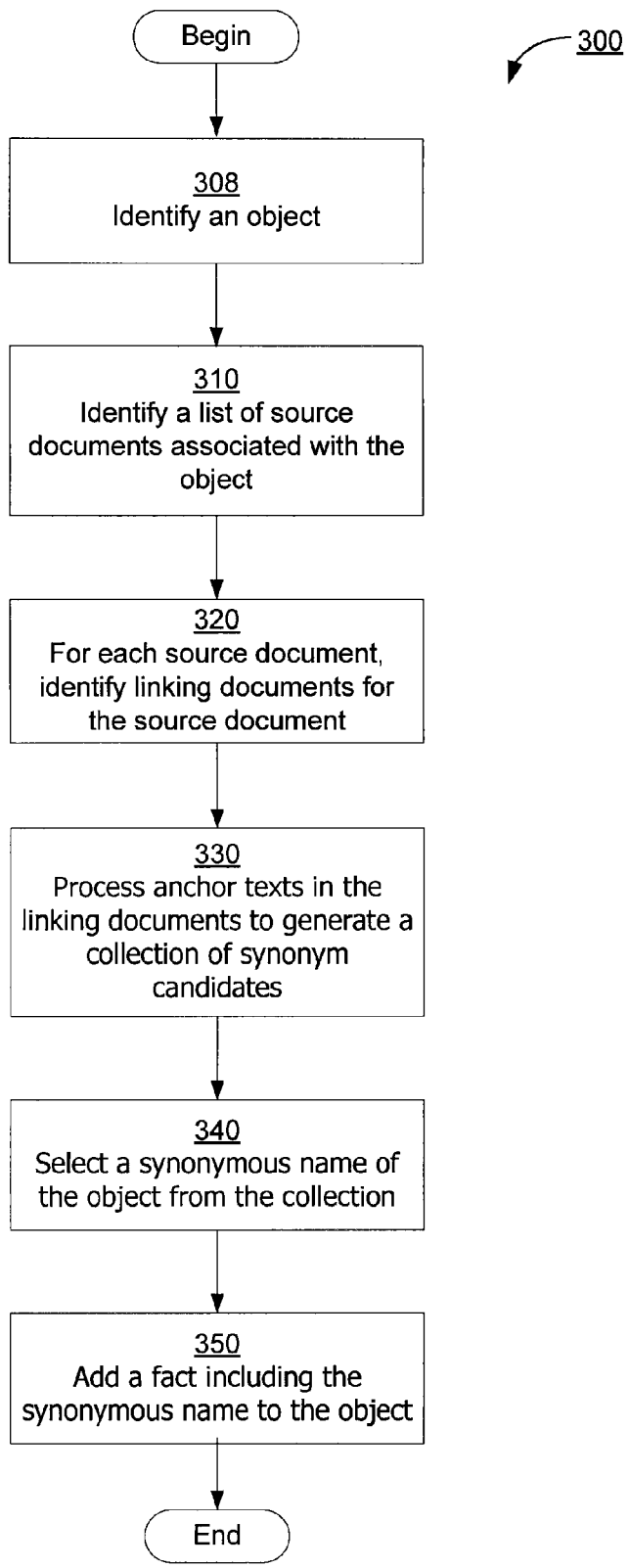
FIG. 3 is a flow diagram illustrating a method for determining synonymous names of an object in accordance to one embodiment.

Referring now to FIG. 3, there is shown a flow diagram illustrating a method 300 for determining synonymous names of an object in accordance with one embodiment. Other embodiments perform steps of the method 300 in different orders and/or perform different or additional steps than the ones shown in FIG. 3. The steps of the method 300 may be implemented in software, hardware, or a combination of hardware and software.

In one embodiment, the steps of the method 300 may be performed by the data processing system ("system") 106 as shown in FIG. 1, although one skilled in the art will recognize that the method 300 could be performed by systems having different architectures as well. The system 106 can perform multiple instances of the steps of the method 300 concurrently and/or perform steps in parallel.

The method 300 will now be described in detail. An object representing (or describing) an entity is identified 308 from the repository 115. As described above, each object can be identified by a unique object ID and is defined by the collection of facts associated with the object ID.

The system 106 identifies 310 a list of source documents associated with the object. A source document associated with an object is a document from which one or more facts of the object was extracted (or derived). A source document can be located and/or identified by a unique identifier such as a URL. In one embodiment, each fact in the repository 115 includes a field for unique identifiers of associated source documents (hereinafter called the source field). The system 106 can retrieve the facts associated with the object from the repository 115 using the object reference table 210 as described above with reference to FIG. 2(c). After retrieving the facts associated with the object, the system 106 can identify 310 the list of source documents associated with the object based on the source fields of the retrieved facts. A fact can have multiple source documents.

The subject of a source document tends to be the entity represented by the object associated with the source document. This is because the content of the source document includes at least one fact about the entity. However, a source document may have more than one subject. For example, a source document may be a BLOG covering a broad range of topics, the entity represented by the associated object being one of them. In one embodiment, the system 106 removes source documents having multiple subjects from the identified list of source documents. The system 106 may construct a list of source documents and their associated objects. If a source document associates with objects representing different entities, the system 106 can remove the source document from the identified list of source documents.

For each of the source documents in the identified list, the system identifies 320 linking documents containing hyperlinks to the source document. As described above, a document can include one or more hyperlinks to other documents. Therefore, a linking document may also include hyperlinks to documents other than to the source document. However, the hyperlink that is of interest to the system 106 is the hyperlink to the source document. As used herein, a linking document containing a hyperlink to a source document is called a linking document for the source document.

A hyperlink includes a starting anchor tag, which includes one or more parameters (or markup attributes), and an ending anchor tag. The starting and ending anchor tags define the hyperlink. A hypertext reference attribute (e.g., "HREF") is one type of markup attribute. The hypertext reference attribute indicates that the associated value is the address of the destination of the hyperlink. The text between the starting anchor tag and the ending anchor tag is called the anchor text of the hyperlink. For example, in the following hyperlink, <a href="http://www.cnn.com/">CNN</a>

"<a href="http://www.cnn.com/">" is the starting anchor tag, "CNN" is the anchor text, and "</a>" is the ending anchor tag. In the starting anchor tag, "href" is the hypertext reference attribute and "http://www.cnn.com/" is the associated value and the address of the destination of the hyperlink (the destination address). The anchor text, if clicked by a user, triggers a request (e.g., an HTTP request) for a document located at the destination address (the destination document). Because an anchor text is rendered for presentation for the destination document to a user, it tends to reflect the subject of the destination document. Therefore, the anchor text of a hyperlink in a linking document for a source document tends to reflect the subject of the source document. As used herein, the anchor text of a hyperlink in a linking document for a source document is called the anchor text for the source document in the linking document. It is noted that methods of linking documents other than using hyperlinks can also be used and the described process can be readily applied to these other methods.

The system 106 processes 330 the anchor texts in the linking documents to generate a collection of synonym candidates (also known as the "anchor synset") for the object name. This step is designed to remove those anchor texts that are not related to the subject of the associated source document (e.g. "Click here!") and to clean up the remaining anchor texts (e.g., removing portions of an anchor text unrelated to the subject of the associated source document). The results of the processing 330 are the collection of synonym candidates, each of which is intended to describe the entity represented by the object.

As discussed above, anchor texts for a source document tend to reflect the subject of the source document, which in turn tends to describe the entity represented by the associated object. It follows that the anchor texts for a source document tend to describe the entity represented by the object associated with the source document. Thus, the system 106 can generate synonym candidates of the object name from anchor texts for the associated source documents.

For example, authors of linking documents can associate the anchor text "Big Blue" or "IBM" with a hyperlink to a source document about the International Business Machines Corporation, which is a source document of an object representing the International Business Machines Corporation. Because the subject of the source document (the International Business Machines Corporation) correctly describes the entity represented by the object, and the anchor texts for the source document reflect its subject, the anchor texts ("Big Blue" and "IBM") tend to be valid synonymous names of the object.

Some anchor texts may be invalid synonymous names of the object. Authors of linking documents can use generic language as the anchor text (e.g., "click here," "see wikipedia article") or include in the anchor texts language that is not related to the subject of the associated linking document (e.g., "click here for an excellent article about IBM"). An anchor text including both information describing the subject of the associated source document and unrelated information (e.g., "click here for an excellent article about") is called a partially-related anchor text. An anchor text that includes only unrelated information (e.g., "Click here!") is called an unrelated anchor text. The system 106 processes 330 anchor texts in the identified linking documents to remove unrelated anchor texts and unrelated information from partially-related anchor texts.

In one embodiment, the system 106 removes unrelated information from a partially-related anchor text by extracting a noun phrase (or a noun) from the anchor text. Because the synonym candidates are intended to describe the object, they are either nouns (e.g., "Canada") or noun phrases (e.g., "the International Business Machines Corporation"). By extracting a noun phrase from the anchor text, the system 106 identifies a portion of the anchor text that tends to be relevant to the object. For example, the noun phrase of an anchor text "Learn about Google Inc." is "Google Inc." By extracting a noun phrase from an anchor text, the system 106 removes text unrelated to the subject of the associated source document (e.g., "Learn about" in the above example). The system 106 can then add the extracted noun phrase into the anchor synset.

In one embodiment, the system 106 has a collection of texts that are commonly used in anchor texts and unrelated to subjects of the associated destination documents (hereinafter called the "black list"). This black list can be compiled by domain experts (e.g., administrators of the system 106) or automatically generated by the system 106. The black list can include standard anchor texts such as "here," "click here," "download," and the like. The system 106 can remove an unrelated anchor text by matching it with texts in the black list and not adding it into the anchor synset if a match is detected.

The black list may also contain prefix and suffix texts. The system 106 may remove unrelated information from a partially-related anchor text by matching it with the prefix and/or suffix texts and remove the matched prefix and/or suffix from it. For example, "Wikipedia article about" can be a frequently used prefix and included in the black list. The system 106 identifies that an anchor text "Wikipedia article about the King" includes the prefix and removes it from the anchor text. Other popular prefix texts include "See Wikipedia for," "article for," and the like. The system 106 can then add the remainder into the anchor synset.

In one embodiment, the system 106 applies normalization rules to an anchor text to standardize its format before processing 330. Examples of the normalization rules include removal of punctuation, such as removing commas in a string, conversion of uppercase characters in a string to corresponding lowercase characters, such as from "America" to "america," and stop word removal, such as removing stop words such as "the," "a," and "of" from a string. For example, after applying the above normalization rules, an anchor text "Click here!" becomes "click here." Subsequently, the system 106 detects a match in the black list for the normalized anchor text and does not add it to the anchor synset. In one embodiment, the system 106 applies language-dependent normalization rules based on the language of the linking document. For example, the system 106 can identify Spanish as the language of a linking document, and apply a set of Spanish stop word removal rules to the anchor texts in the linking document.

Similarly, the system 106 can have a collection of texts that tend to be valid synonymous names (hereinafter called "white list"). This white list can be compiled by authorized personnel or imported from one or more information sources. For example, the white list can contain company names extracted from a business-related website or peoples' names from a telephone directory. The system 106 can process 330 the anchor texts by matching them with the texts in the white list and add those that match into the anchor synset. By adding the anchor texts that match with an entry in the white list, the system 106 generates synonym candidates that tend to be valid synonymous names.

The system 106 selects 340 synonymous names of the object from the collection of synonym candidates (the anchor synset). The synonym candidates generated may contain identification language that does not qualify as synonymous names. For example, some of the synonym candidates can reflect the author's personal opinion (e.g., "my favorite movie star"), while some others can be descriptive names used exclusively within a small group of people (e.g., "Party Ed"). The system selects 340 synonymous names by filtering out these invalid synonym candidates.

In one embodiment, the system 106 selects 340 synonymous names based on the frequency of occurrence of the synonym candidates within the anchor synset. For example, the system 106 can be configured to select 340 synonym candidates that occur at a frequency above a minimum threshold. The threshold can be user-defined or dynamically modified by the system 106. Rarely occurring synonym candidates tend to be incorrect synonymous names (e.g., containing spelling errors). Further, even if the rarely occurring synonym candidates contain legitimate synonym names, these legitimate synonym names are rarely used and can be omitted with minimal harm. Examples of synonym candidates that occur infrequently include authors' personal opinions and names used only by a small group of people.

The system 106 can also be configured to select 340 the synonym candidates that occur at a frequency below a maximum threshold. Synonym candidates that occur extremely frequently also tend not to be synonymous names because they can be general phrases unrelated to the subject of the associated source document. Examples of synonym candidates with extremely high occurrence rates include "the company," "home page," and "click here." In some embodiments, the system 106 can add a synonym candidate that occurs frequently into the black list. Alternatively, the system 106 can output the synonym candidates occurring at a frequency exceeding the maximum threshold so that an administrator can review them and select 340 them if they are removed by mistake.

In one embodiment, instead of selecting 340 synonymous names based on the frequency of occurrence of the synonym candidates, the system 106 selects 340 synonymous names based on the proportion of the synonym candidates in the collection of synonym candidates. For example, the system 106 can be configured to select 340 only the synonym candidates that constitute more than 5% of the total anchor synset.

In one embodiment, the system 106 selects 340 synonymous names based on the quality of the associated linking documents. The quality of a linking document can be user defined or machine generated. For example, the system 106 can determine the quality of the linking document based on a page rank of the linking document. A page rank is a numerical weight for a document determined by a link analysis algorithm such as the algorithm described in U.S. Pat. No. 6,285,999. Because high quality linking documents tend to have high quality anchor texts (e.g., fewer spelling errors), synonym candidates generated from these documents are more likely to be proper synonymous names of the object. In some embodiments, the system 106 adds synonymous names generated from high-quality documents into the white list.

In one embodiment, the system 106 assigns a score for each synonym candidate in the anchor synset, and selects 340 synonymous names based on the assigned scores. The score for a synonym candidate may be determined based on a score function taking into account one or more of the following factors: the frequency of occurrence or the proportion of the synonym candidate within the anchor synset, the quality of the associated linking documents, whether the synonym candidate has a match in the white list or the black list, and whether the synonym candidate is properly capitalized (e.g., whether the first character of each word in the synonym candidate and only these characters are capitalized). The system 106 may select 340 a synonym candidate as a synonymous name if its score above a minimum threshold and/or below a maximum threshold.

The system 106 can process 330 the anchor texts associated with different source documents separately and generate a collection of synonym candidates for each of the source documents. The system 106 can then select 340 synonymous names from each of the collections. Alternatively, the system 106 can process 330 the anchor texts associated with different source documents together and generate one single anchor synset, and subsequently select 340 synonymous names from the anchor synset.

After selecting 340 the synonymous names, the system 106 adds 350 facts including the selected synonymous names to the object in the repository 115. For example, the system 106 may create a name fact for each of the selected synonymous names, assign the synonymous names as the values of the name facts, and associate the created facts with the object.

After the system 106 determines the synonymous names of the object, it can process the other objects in the repository 115 and determine their synonymous names. As noted above, the system can determine the synonymous names of multiple objects concurrently and/or in parallel.

It is noted that the process described above is language-neutral and can be used to determine synonymous names in any language.

Example Process

Figure 4A:
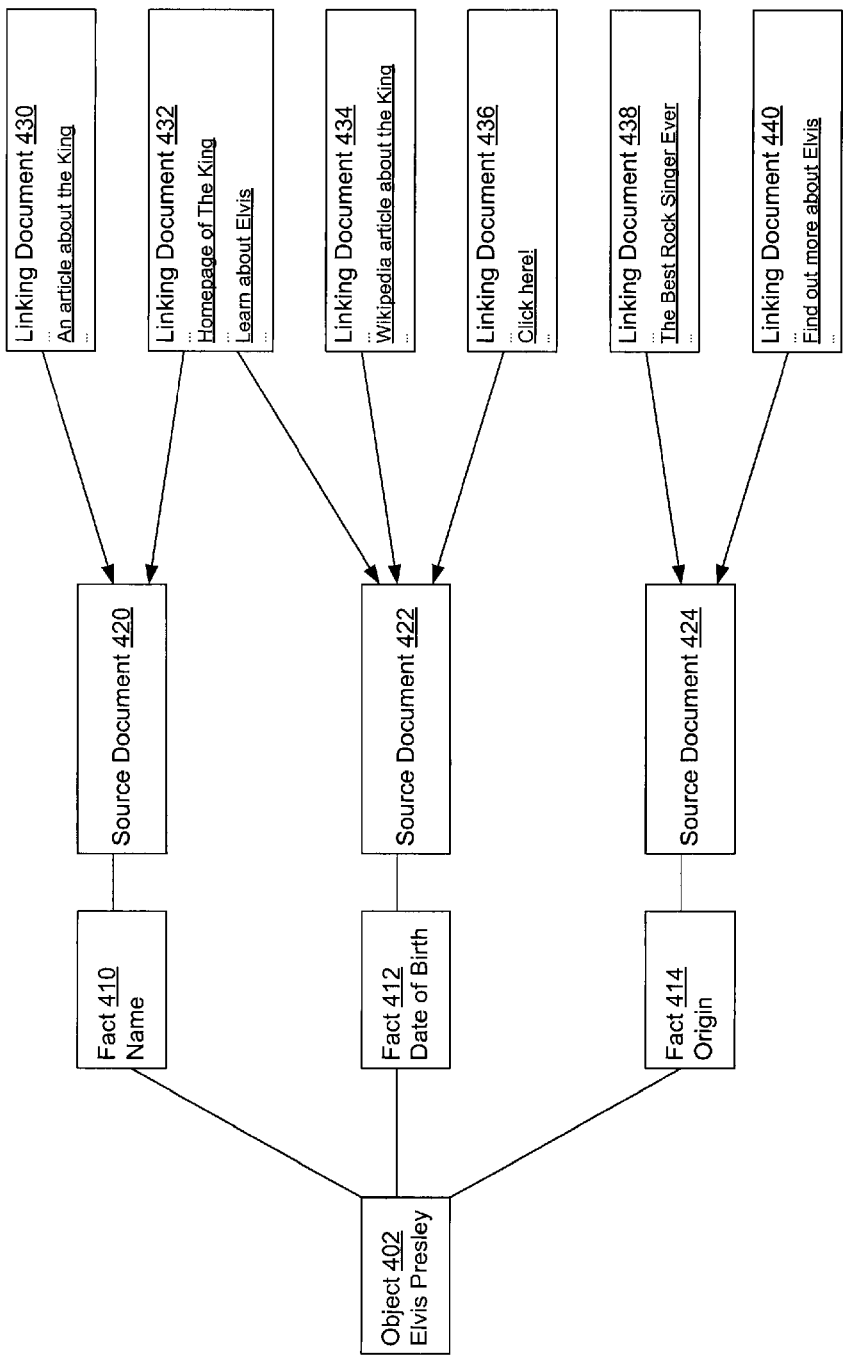

FIGS. 4(*a*) through 4(*e*) illustrate an example process of the method 300 described above with respect to FIG. 3. Initially, as illustrated in FIG. 4(*a*), the system 106 identifies 308 an object 402 representing the rock singer Elvis Presley. The object 402 has three associated facts 410, 412, and 414. As further illustrated in FIG. 4(*b*), the fact 410 has an attribute of "Name," a value of "Elvis Aaron Presley," and a source of "http://www.elvis.com/elvisology/bio/elvis_overview.asp." The fact 412 has an attribute of "Date of Birth," a value of "Jan. 8, 1935," and a source of "http://en.wikipedia.org/wiki/Elvis." The fact 414 has an attribute of "Origin," a value of "East Tupelo, Miss., United States," and a source of "http://www.history-of-rock.com/elvis_presley.htm." The name of the object 402 is the value of the fact 410, "Elvis Aaron Presley."

The system 106 identifies 310 source documents associated with the object 402 by identifying facts associated with the object 402, the facts 410, 412, and 414, retrieving these facts from the repository 115, and identifying 310 the associated source documents by accessing source fields of the retrieved facts. The fact 410 is associated with a source document 420. The fact 412 is associated with a source document 422. The fact 414 is associated with a source document 424. Therefore, the system 106 identifies 310 source documents associated with the object 402 as the source documents 420, 422, and 424. As illustrated in FIG. 4(*b*), the URLs of the source documents 420, 422, and 424 are "http://www.elvis.com/elvisology/bio/elvis_overview.asp," "http://en.wikipedia.org/wiki/Elvis," and "http://www.history-of-rock.com/elvis_presley.htm," respectively.

The system 106 identifies 320 linking documents for the source documents 420, 422, and 424. The system 106 identifies 320 two linking documents 430 and 432 for the source document 420, three linking documents 432, 434, and 436 for the source document 422, and two linking documents 438 and 440 for the source document 424. It is noted that the linking document 432 is identified as a linking document for both the source documents 420 and 422.

Referring now to FIG. 4(c), the column labeled "Linking Document ID" (linking document column) contains the document identifiers of linking documents identified 320 by the system 106. The column labeled "Source Document ID" (source document column) contains the document identifier of the source document to which the linking document as identified in the linking document column links. The column "Anchor Text" contains the anchor text for the associated source document in the associated linking document. As shown in FIG. 4(c), the anchor text for the source document 420 in the linking document 430 is "An article about the King." The anchor text for the source document 420 in the linking document 432 is "Homepage of The King." The anchor text for the source document 422 in the linking document 432 is "Learn about Elvis." The anchor text for the source document 422 in the linking document 434 is "Wikipedia article about the King." The anchor text for the source document 422 in the linking document 436 is "Click here!" The anchor text for the source document 424 in the linking document 438 is "The Best Rock Singer Ever." The anchor text for the source document 424 in the linking document 440 is "Find out more about Elvis."

The system 106 processes 330 the anchor texts in the linking documents 430, 432, 434, 436, 438, and 440 and generates a collection of synonym candidates for the object 402. Referring to FIG. 4(d), the system 106 processes 330 the anchor text in the linking document 430 ("An article about the King") by removing the common prefix "An article about" and generates a synonym candidate "the King;" processes 330 the anchor text for the source document 420 in the linking document 432 ("Homepage of The King") by removing the common prefix "Homepage of" and generates a synonym candidate "The King;" processes 330 the anchor text for the source document 422 in the linking document 432 ("Learn about Elvis") by removing the common prefix "Learn about" and generates a synonym candidate "Elvis;" processes 330 the anchor text in the linking document 434 ("Wikipedia article about the King") by removing the common prefix "Wikipedia article about" and generates a synonym candidate "the King;" processes 330 the anchor text in the linking document 440 ("Find out more about Elvis") by removing the common prefix "Find out more about" and generates a synonym candidate "Elvis." The system 106 generates a synonym candidate based on the anchor text in the linking document 438 ("The Best Rock Singer Ever"). The system 106 detects a match in the black list for the anchor text in the linking document 436 ("Click here!") and does not generate any synonym candidates based on it.

The system 106 selects 340 synonymous names from the collection of synonym candidates. Referring to FIG. 4(d), the collection of the synonym candidates includes "the King," "The King," "Elvis," "the King," "The Best Rock Singer Ever," and "Elvis." The system 106 selects 340 the synonym candidates occurring no less than twice (minimum threshold) and no more than one hundred times (maximum threshold). Assuming the system 106 is case insensitive, it selects 340 the synonym candidates "the King," which occurs three times, and "Elvis," which occurs twice. The synonym candidate "The Best Rock Singer Ever" has only one occurrence, smaller than the minimum threshold, and thus is not selected 340. Therefore, the system 106 correctly identifies the synonymous names "The King" and "Elvis" for the object 402 representing Elvis Presley.

The system 106 adds 350 two facts to the object 402. As illustrated in FIG. 4(e), the system 106 creates a fact 416 for the synonymous name "The King" and a fact 418 for the synonymous name "Elvis." The source field of the facts 416, 418 shown in FIG. 4(e) is empty. However, the system 106 may list the URLs of the linking documents from which the synonymous names are derived in the corresponding source field. For example, the source field of the name fact 416 may include URLs for the linking documents 430, 432, and 434.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method of determining a synonymous name for an entity represented by an object stored in a fact repository, comprising:
    at a server having a plurality of processors and memory storing the repository and programs configured for execution by the processors, wherein the repository includes a plurality of facts extracted from web documents, wherein a subset of the facts is associated with the object, and wherein the object has an object name associated with the entity,
        identifying a source document from which one or more of the subset of facts of the entity represented by the object were derived;
        identifying a plurality of linking documents having hyperlinks to the source document, each hyperlink having an anchor text;
        generating a collection of synonym candidates for the entity using the anchor texts in the plurality of linking documents;
        selecting a synonymous name for the entity represented by the object from the collection of synonym candidates, wherein selecting the synonymous name for the entity represented by the object from the collection of synonym candidates further comprises:
            determining a score for each synonym candidate in the collection of synonym candidates based on a score function, the score function taking into account:
                a frequency of occurrence of the synonym candidate in the collection of synonym candidates, and
                a proportion of the synonym candidate in the collection of synonym candidates;
            selecting the synonymous name for the entity represented by the object from the collection of synonym candidates based on their scores; and
        storing the synonymous name in the repository in association with the object in addition to the object name.

2. The method of claim 1, wherein identifying the source document further comprises:
    identifying a list of source documents from which one or more facts of the entity represented by the object were derived;
    removing from the list identifiers of source documents from which one or more facts of another entity were derived from the list; and
    identifying the source document from the list of source documents.

3. The method of claim 1, wherein generating the collection of synonym candidates for the entity using the anchor texts in the plurality of linking documents further comprises:
    normalizing the anchor texts in the plurality of linking documents; and
    generating the collection of synonym candidates for the entity using the normalized anchor texts.

4. The method of claim 3, wherein normalizing the anchor texts in the plurality of linking documents further comprises:
    identifying a language of one of the plurality of linking documents; and
    applying normalization rules for the language to normalize the anchor text in the one of the plurality of linking documents.

5. The method of claim 1, wherein generating the collection of synonym candidates for the entity using the anchor texts in the plurality of linking documents further comprises:
    extracting a noun phrase from one of the anchor texts in the plurality of linking documents; and
    generating the collection of synonym candidates for the entity using the extracted noun phrase.

6. The method of claim 1, wherein generating the collection of synonym candidates for the entity using the anchor texts in the plurality of linking documents further comprises:
    removing a prefix or a suffix from the anchor texts in the plurality of linking documents.

7. The method of claim 1, wherein generating the collection of synonym candidates for the entity using the anchor texts in the plurality of linking documents further comprises:
    matching an anchor text with a black list of texts; and
    responsive to detecting a match of the anchor text with the black list, removing the anchor text from the collection of synonym candidates for the entity represented by the object.

8. The method of claim 1, wherein generating the collection of synonym candidates for the entity using the anchor texts in the plurality of linking documents further comprises:
    matching an anchor text with a white list of texts; and
    responsive to detecting a match of the anchor text with the white list, adding the anchor text into the collection of synonym candidates for the entity represented by the object.

9. The method of claim 1, wherein selecting the synonymous name for the entity represented by the object from the collection of synonym candidates further comprises:
    selecting a synonym candidate occurring at a frequency in the collection of synonym candidates no less than a minimum threshold as the synonymous name for the entity represented by the object.

10. The method of claim 9, further comprising:
    responsive to a synonym candidate occurring at a frequency in the collection of synonym candidates less than the minimum threshold, adding the synonym candidate into a black list of texts.

11. The method of claim 1, wherein selecting the synonymous name for the entity represented by the object from the collection of synonym candidates further comprises:
  selecting a synonym candidates occurring at a frequency in the collection of synonym candidates no more than a maximum threshold as the synonymous name for the entity represented by the object.

12. The method of claim 11, further comprising:
  responsive to a synonym candidate occurring at a frequency in the collection of synonym candidates more than the maximum threshold, adding the synonym candidate into a black list of texts.

13. The method of claim 1, wherein selecting the synonymous name for the entity represented by the object from the collection of synonym candidates further comprises:
  determining quality for the plurality of linking documents; and
  selecting the synonymous name for the entity represented by the object from the collection of synonym candidates based on the quality of the linking document having the anchor text from which the synonymous name was generated.

14. The method of claim 1, wherein
  the score function further takes into account at least one of the following factors:
    a quality of the linking document having the anchor text from which the synonym candidate was generated,
    whether the synonym candidate has a match in a white list,
    whether the synonym candidate has a match in a black list, and
    whether the synonym candidate is properly capitalized.

15. A system for determining a synonymous name for an entity represented by an object stored in a repository, comprising:
  a processor for executing programs;
  memory for storing the repository and the programs, wherein the repository includes a plurality of facts extracted from web documents, wherein a subset of the facts is associated with the object, and wherein the object has an object name associated with the entity; and
  a subsystem executable by the processor, the subsystem including:
    instructions for identifying a source document from which one or more of the subset of facts of the entity represented by the object were derived;
    instructions for identifying a plurality of linking documents having hyperlinks to the source document, each hyperlink having an anchor text;
    instructions for generating a collection of synonym candidates for the entity using the anchor texts in the plurality of linking documents;
    instructions for selecting a synonymous name for the entity represented by the object from the collection of synonym candidates, wherein selecting the synonymous name for the entity represented by the object from the collection of synonym candidates further comprises:
      determining a score for each synonym candidate in the collection of synonym candidates based on a score function, the score function taking into account:
        a frequency of occurrence of the synonym candidate in the collection of synonym candidates, and
        a proportion of the synonym candidate in the collection of synonym candidates
      selecting the synonymous name for the entity represented by the object from the collection of synonym candidates based on their scores; and
    instructions for storing the synonymous name in the repository in association with the object in addition to the object name.

16. The system of claim 15, wherein the instructions for identifying a source document further comprises:
  instructions for identifying a list of source documents from which one or more facts of the entity represented by the object were derived;
  instructions for removing from the list identifiers of source documents from which one or more facts of another entity were derived from the list; and
  instructions for identifying the source document from the list of source documents.

17. The system of claim 15, wherein the instructions for generating the collection of synonym candidates for the entity using the anchor texts in the plurality of linking documents further comprise:
  instructions for normalizing the anchor texts in the plurality of linking documents; and
  instructions for generating the collection of synonym candidates for the entity using the normalized anchor texts.

18. A computer program product stored on a non-transitory computer readable storage medium and for use in conjunction with a computer system, the computer program product comprising a computer program mechanism embedded therein, the computer program mechanism including:
  instructions for identifying a source document from which one or more facts of an entity represented by an object were derived, the facts and the object being stored in a repository that can be accessed by the computer system, the facts being associated with the object, and the object having an object name associated with the entity;
  instructions for identifying a plurality of linking documents having hyperlinks to the source document, each hyperlink having an anchor text;
  instructions for generating a collection of synonym candidates for the entity using the anchor texts in the plurality of linking documents;
  instructions for selecting a synonymous name for the entity represented by the object from the collection of synonym candidates, wherein selecting the synonymous name for the entity represented by the object from the collection of synonym candidates further comprises:
    determining a score for each synonym candidate in the collection of synonym candidates based on a score function, the score function taking into account:
      a frequency of occurrence of the synonym candidate in the collection of synonym candidates, and
      a proportion of the synonym candidate in the collection of synonym candidates;
    selecting the synonymous name for the entity represented by the object from the collection of synonym candidates based on their scores; and
  instructions for storing the synonymous name in the repository in association with the object in addition to the object name.

19. The computer program product of claim 18, wherein the instructions for identifying a source document further includes:
  instructions for identifying a list of source documents from which one or more facts of the entity represented by the object were derived;

instructions for removing from the list identifiers of source documents from which one or more facts of another entity were derived from the list; and instructions for identifying the source document from the list of source documents.

20. The computer program product of claim 18, wherein the instructions for generating the collection of synonym candidates for the entity using the anchor texts in the plurality of linking documents further comprise:

instructions for normalizing the anchor texts in the plurality of linking documents; and instructions for generating the collection of synonym candidates for the entity based on the name of the object using the normalized anchor texts.

21. The system of claim 17, wherein the instructions for normalizing the anchor texts in the plurality of linking documents further comprises:

instructions for identifying a language of one of the plurality of linking documents; and instructions for applying normalization rules for the language to normalize the anchor text in the one of the plurality of linking documents.

22. The system of claim 15, wherein the instructions for generating the collection of synonym candidates for the entity using the anchor texts in the plurality of linking documents further comprise:

instructions for extracting a noun phrase from one of the anchor texts in the plurality of linking documents; and instructions for generating the collection of synonym candidates for the entity using the normalized anchor texts.

23. The system of claim 15, wherein the instructions for generating the collection of synonym candidates for the entity using the anchor texts in the plurality of linking documents further comprise:

instructions for removing a prefix or a suffix from the anchor texts in the plurality of linking documents.

24. The system of claim 15, wherein the instructions for generating the collection of synonym candidates for the entity using the anchor texts in the plurality of linking documents further comprise:

instructions for matching an anchor text with a black list of texts; and instructions for responsive to detecting a match of the anchor text with the black list, removing the anchor text from the collection of synonym candidates for the entity represented by the object.

25. The system of claim 15, wherein the instructions for generating the collection of synonym candidates for the entity using the anchor texts in the plurality of linking documents further comprise:

instructions for matching an anchor text with a white list of texts; and instructions for responsive to detecting a match of the anchor text with the white list, adding the anchor text into the collection of synonym candidates for the entity represented by the object.

26. The system of claim 15, wherein the instructions for selecting the synonymous name for the entity represented by the object from the collection of synonym candidates further comprises:

instructions for determining quality for the plurality of linking documents; and instructions for selecting the synonymous name for the entity represented by the object from the collection of synonym candidates based on the quality of the linking document having the anchor text from which the synonymous name was generated.

27. The system of claim 15, wherein the score function further takes into account at least one of the following factors:

a quality of the linking document having the anchor text from which the synonym candidate was generated, whether the synonym candidate has a match in a white list, whether the synonym candidate has a match in a black list, and whether the synonym candidate is properly capitalized.

* * * * *